Oct. 1, 1935.  K. STEINER  2,016,058
REFLEX CAMERA
Filed March 16, 1932
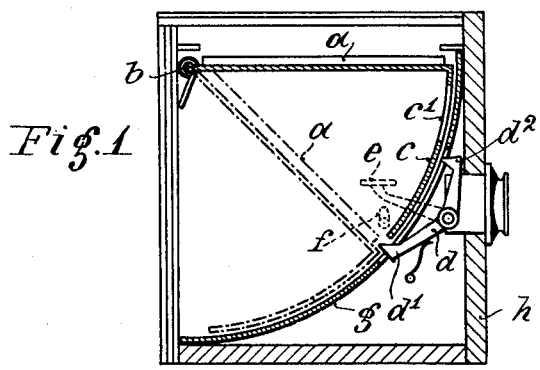
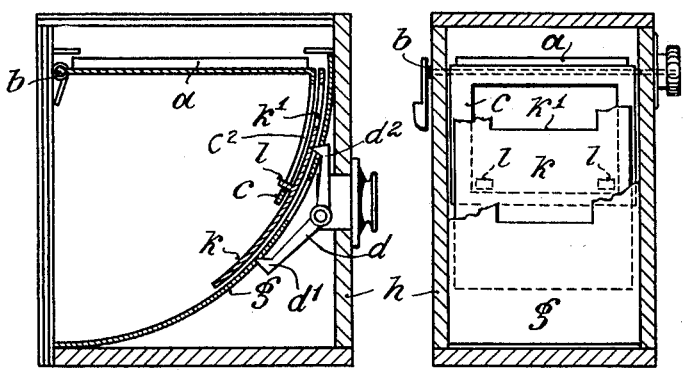
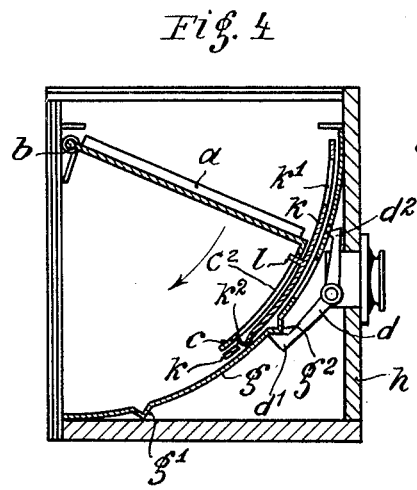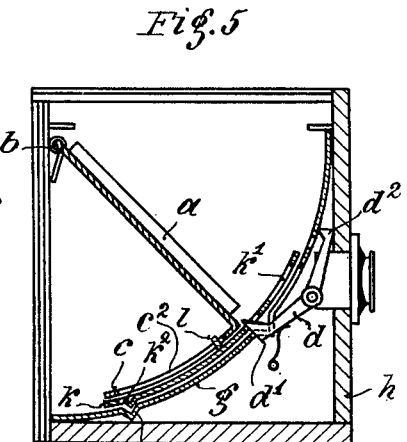

Patented Oct. 1, 1935

2,016,058

UNITED STATES PATENT OFFICE 2,016,058

REFLEX CAMERA

Kurt Steiner, Munich, Germany

Application March 16, 1932, Serial No. 599,276
In Germany March 23, 1931

5 Claims. (Cl. 95—42)

The present invention refers to a reflex camera which is at the same time simple in construction and practical in use, allowing accurate and convenient setting of the shutter, a special feature of the latter being its absolutely light-tight closure of the lens.

In the accompanying drawing, like characters of reference indicate like parts in the several views, and Figure 1 is a vertical section taken longitudinally through a camera and showing one form of the invention.

Figure 2 is a similar view showing a second form of the invention with the shutter closed.

Figure 3 is a transverse section through the camera as shown in Figure 2.

Figure 4 is a view similar to Figure 2 but with the mirror and shutter in intermediate positions.

Figure 5 is a view similar to Figure 2 but with the mirror and shutter in position to reflect the image upwardly and thus in focusing position.

Fig. 1 shows one form of construction of the camera in section; at the end of the mirror $a$, which is pivoted at $b$, is attached a shutter $c$ of segmental form, this type of shutter being a part of the prior art. According to the present invention this shutter $c$ with exposure slit $c^1$ is made of a suitable flexible material, for instance, of thin and springy sheet metal, by which means a close and light-tight contact between shutter $c$ and the cylindrical shutter guide $g$ can be attained, without danger of the shutter jamming, as frequently happens with shutters of inflexible material.

The mirror $a$ is brought into the focusing position by turning it down about 45° as shown by the dotted lines; the shutter is held in this position by a detent and release device, which can be adjusted for instantaneous and time exposures. In the form of construction under consideration this detent consists of an anchor-shaped double lever $d$, the two ends of which form detents $d^1$ and $d^2$. When mirror $a$ and shutter $c$ are brought into the focusing position shown by dotted lines in Fig. 1, that is, ready for an exposure, detent $d^1$ of double lever $d$ will hold them in this position until pressure on the spring pressed lever $e$ outside the camera causes detent $d^1$ to release the shutter. The stroke of lever $e$ is limited by an adjustable stop $f$. According to the position of this stop $f$, release lever $e$ can be pressed a lesser or greater distance downwards; in the former case, detent $d^1$ will be withdrawn only so far that the shutter is released and can return under spring pressure to the uppermost position, thus making an instantaneous exposure; in the latter case, detent $d^1$ will be withdrawn so as to release the shutter and at the same time detent $d^2$ will arrest the shutter in the exposure position until the release of lever $e$ causes detent $d^2$ to be again withdrawn, whereupon the shutter will complete its upward motion and again close the lens. The speed of the shutter for instantaneous exposures can be regulated by a brake in known manner. In the form of construction shown in Fig. 1, the dark slide must be kept closed during the setting of the shutter, as otherwise a premature exposure will result.

In Figs. 2 to 5 a form of construction is shown, in which the shutter can be set without danger of premature exposure even when the dark slide is open.

In this form of the camera an auxiliary shutter $k$ is arranged to slide between shutter $c$ and shutter guide $g$. Shutter $c$ is again attached to the free end of the mirror $a$, but is provided with a wider slit or exposure aperture $c^2$ than in the form of construction according to Fig. 1. Shutter $c$ and auxiliary shutter $k$ are, as before, made of flexible material, in order to prevent jamming of the moving parts and at the same time to secure a light-tight closure of the shutter. Auxiliary shutter $k$ is provided with an exposure slit $k^1$ of normal width and further with a pin $l$ engaging within the aperture of shutter $c$. Fig. 2 shows the initial position of mirror and shutters. If mirror $a$ with shutter $c$ is now moved downwards, auxiliary shutter $k$ will remain in the initial position until the upper edge of the aperture of shutter $c$ engages with pin $l$; auxiliary shutter $k$ will then partake of the further downward motion of mirror $a$ and shutter $c$. At the same time spring detent $k^2$ of the auxiliary shutter $k$ engages with the lower edge of the aperture of shutter $c$, thus locking shutters $c$ and $k$ together, as shown in Fig. 4. By this means the auxiliary shutter $k$ is forced to take part in every movement, both downward and upward, of mirror $a$ and shutter $c$ in the intermediate position, thereby making an accidental preliminary exposure impossible, the interior of the camera being closed perfectly light-tight during the entire travel of the mirror from the initial position (Fig. 2) to the set position (Fig. 5). In the latter position the spring detent $k^2$ of auxiliary shutter $k$ will engage in the recess $g^1$ of shutter guide $g$.

In the form of construction according to Figs. 2 to 5, the detent and release device $d$ is the same as in Fig. 1. The lower detent $d^1$ first holds the mirror with shutter in the focusing position;

after withdrawal of detent $d^1$, mirror $q$ and shutter $c$ will swing upwards, auxiliary shutter $k$ however retaining its position until the lower edge of the aperture of shutter $c$ engages with pin $l$, thus compelling shutter $k$ to again take part in the upward motion of the mirror; spring detent $k^2$ is at the same time forced out of recess $g^1$ and again locks shutters $c$ and $k$ together. In the upper end position of mirror and shutter, spring detent $k^2$ will engage in recess $g^2$ of the shutter guide $g$, thus securing the position of the auxiliary shutter. Spring detent $k^2$ therefore serves a double purpose, firstly, to lock shutter $c$ and auxiliary shutter $k$ together during their mutual motion, and secondly, to lock the auxiliary shutter in the two end positions. In this form of construction the detent release lever $d$ can also be set for either instantaneous or time exposure.

What I claim as my invention, is:

1. A reflex camera having a mirror, a segmental shutter of flexible material carried by the mirror, and a shutter guide with which the flexible shutter establishes light tight contact.

2. In a reflex camera, a pivotally mounted mirror, a flexible shutter carried thereby, a shutter guide with which the shutter makes light-tight contact, a pivotally mounted lever having parts disposed at angles to each other, a detent on the end of each part, said shutter having an aperture and the said detents being adapted to enter the aperture and engage the shutter at different positions of adjustment.

3. In a reflex camera, a pivotally mounted mirror, a flexible shutter carried by the mirror, a shutter guide having an exposure aperture with which the flexible shutter makes light tight contact, detents for controlling the movement of the shutter, an auxiliary shutter arranged in front of and moving concentrically to the mirror, means by which the mirror controls the auxiliary shutter whereby the exposure aperture in the shutter guide is controlled.

4. In a reflex camera according to claim 3 in which the auxiliary shutter is flexible and slides loosely between the first mentioned shutter and the shutter guide.

5. In a reflex camera according to claim 3 characterized in that the auxiliary shutter is provided with a spring detent adapted to lock the aforesaid shutters together during their motion between the two extreme positions of movement and the said shutter guide having a recess to receive the said detent.

KURT STEINER.